United States Patent [19]

Mieth

[11] Patent Number: 4,757,834

[45] Date of Patent: Jul. 19, 1988

[54] METHOD AND APPARATUS FOR THE REALIZATION OF A LEAKAGE-FREE SWITCHING DOUBLE SEAT VALVE ADAPTED FOR CLEANING SEAT SURFACES

[75] Inventor: Hans O. Mieth, Schnakenbek, Fed. Rep. of Germany

[73] Assignee: Otto Tuchenhagen GmbH & Co. KG, Büchen, Fed. Rep. of Germany

[21] Appl. No.: 868,086

[22] Filed: May 29, 1986

Related U.S. Application Data

[63] Continuation-in-part of Ser. No. 643,747, Aug. 23, 1984, which is a continuation of Ser. No. 283,185, Jul. 14, 1981, abandoned.

[30] Foreign Application Priority Data

Jun. 11, 1985 [EP] European Pat. Off. ........ 85107177.9

[51] Int. Cl.$^4$ .................... B08B 3/04; B08B 9/02; F16K 1/44; F16K 31/122
[52] U.S. Cl. .................................. 137/15; 134/166 C; 137/240; 137/312; 137/614.17; 137/614.19
[58] Field of Search ............ 137/15, 240, 312, 614.11, 137/614.17, 614.18, 614.19; 134/166 C

[56] References Cited

U.S. PATENT DOCUMENTS

| 4,304,251 | 12/1981 | Schädel et al. | 137/240 |
| 4,344,453 | 8/1982 | Tuchenhagen et al. | 137/240 |
| 4,360,039 | 11/1982 | Jeppsson | 137/240 |
| 4,368,753 | 1/1983 | Brakelmann | 137/240 |
| 4,436,106 | 3/1984 | Tuchenhagen et al. | 137/240 |
| 4,552,167 | 11/1985 | Brakelmann | 137/240 |
| 4,605,035 | 8/1986 | Rasmussen et al. | 137/240 |
| 4,617,955 | 10/1986 | Melgaard | 137/240 |

FOREIGN PATENT DOCUMENTS

| 1157345 | 11/1983 | Canada | 137/240 |
| 2623039 | 5/1977 | Fed. Rep. of Germany . | |
| 2632587 | 6/1977 | Fed. Rep. of Germany . | |
| 3005329 | 3/1981 | Fed. Rep. of Germany . | |

OTHER PUBLICATIONS

European Patent Application 0 122 323 (publication number), filed 10/21/83.
European Patent Application 0 060 910 (publication number), filed 3/24/81.
French Patent Application 2 379 005 (publication number), filed 1/27/78.
European Patent Application 0 044 517 (publication number), filed 1/27/82.

Primary Examiner—George L. Walton
Attorney, Agent, or Firm—Lane and Aitken

[57] ABSTRACT

A method and apparatus for the realization of a leakage-free switching double seat valve allowing cleaning of seats. Said method ensures that in double seat valves comprising closing elements of which one is structurally designed as set disk and the other slide-like, there can be realized a leakage-free switching and the possibility of simultaneous cleaning of the seat surfaces of both closing elements and/or the cleaning of the seat surface of only the slide-like closing element possibly subjected to product action. These advantages are achieved inter alia in that prior to the opening movement of the closing element (5 or 4, respectively) designed as seat disk, the structurally slide-like designed closing element (5 or 4, respectively) is advanced from a resting position towards the closing element (5 or 4, respectively) being in its closing position and remains coupled to it during the entire period of the subsequent open position, in that after the closing movement of the closing element (5 or 4, respectively) designed as seat disk the structurally slide-like closing element (4 or 5, respectively) is separated from the former one and shifted to its resting position, and in that for the purpose of cleaning the seat surface the structurally slide-like closing element (4 or 5, respectively) it is individually slidable from its resting position towards the valve casing part (1 or 2) possibly leading the product (FIG. 3.1).

14 Claims, 11 Drawing Sheets

|     | a | c | b | d   |
|-----|---|---|---|-----|
| 1   | 0 | 1 | 0 | (0) |
| 2   | 0 | 1 | 1 | (1) |
| 3   | 1 | 0 | 1 | (1) |
| 4.1 | 1 | 1 | 0 | (0) |
| 4.2 | 1 | 0 | 0 | 0   |

| | a | c | b |
|---|---|---|---|
| 1 | 0 | 0 | 0 |
| 2 | 0 | 0 | 1 |
| 3 | 0 | 0 | 1 |
| 4.1 | 0 | 1 | 0 |
| 4.2 | 1 | 1 | 0 |

|   | a | c | b | d |
|---|---|---|---|---|
| 1 | 0 | 0/1 | 0 | (0) |
| 2 | 0 | 0/1 | 1 | (1) |
| 3 | 1 | 0 | 1 | (1) |
| 4.1 | 0 | 1 | 0 | (0) |
| 4.2 | 1 | 1 | 0 | 0 |

4,757,834

METHOD AND APPARATUS FOR THE REALIZATION OF A LEAKAGE-FREE SWITCHING DOUBLE SEAT VALVE ADAPTED FOR CLEANING SEAT SURFACES

This is a continuation-in-part of Ser. No. 643,747, filed on Aug. 23, 1984, which is a continuation of Ser. No. 283,185, filed on July 14, 1981, now abandoned.

BACKGROUND OF THE INVENTION

The invention relates to a process for realizing a leakage-free switching double seat valve adapted for cleaning seat surfaces according to the preamable of the main claim.

European Pat. No. 00 44 517 discloses a method and apparatus permitting the simultaneous cleaning of both seat surfaces of a double seat valve while product is present on at least one side of the valve.

In some instances, in particular when using double seat valves in the food processing industry, it is an advantage when switching of the valves can be accomplished without leakage. The term switching leakage is understood as that amount of fluid which in a switching operation leaks from a valve casing part via the respective exposed seat surface into the leakage cavity. If a double seat valve is capable of leakage-free switching owing to its basic structure, such switching leakage will occur both during the open and closing movements of the valve.

Of the various types of double seat valves disclosed in FIGS. 1 to 5a of European Pat. No. 00 44 517, only FIGS. 1 to 3a show types of valves that can provide leakage-free switching. Moreover, none of these five basic types permits a separate cleaning of the seat surface of the piston closing element on which possibly the product acts through the leakage cavity by means of cleansing agent supplied from outside the double seat valve. Such a cleaning method, however, is actually necessary whenever product is in contact with the other valve casing part, which is closed by the seat disk, or cleansing agent cannot otherwise be made available.

On the basis of the above-indicated state of the art, it is an object of the instant invention to provide leakage-free switching and the simultaneous cleaning of the seat surfaces of both closing elements, as well as the separate cleaning of the seat surface of the piston-like closing element while in contact with the product.

The method according to the invention for the first time ensures that all of the double seat valves of the types indicated above will be able to switch without leakage.

In addition, for the types of valves known to switch without leakage prior to the present invention, the invention provides a particularly safe and efficient coupling of the two closing elements since said coupling is no longer solely determined by the opening or closing movement of the double seat valve, but rather, is precisely controlled and the amount of force of the two closing elements results, as is known, from the spring tension with which the latter are braced relative to each other. The spring tension is greatest in the decoupled position of the closing elements; it decreases by an amount corresponding to the relative distance travelled during the lift and then remains practically unchanged during the entire period in which the double seat valve is in the open position.

In a preferred embodiment, by supplying the cleansing agent from outside the double seat valve through the leakage cavity, separate cleaning of the seat surface of the piston-like closing element which may be in contact with the product is provided, since according to the invention it is movable individually from its resting position toward the valve casing part which may be carrying the product.

Another aspect of the invention provides that the cleansing agent supplied from outside the double seat valve, upon exceeding a selectively adjustable pressure, initiates the switching sequence which then proceeds in a manner determined by the design of the valve for cleaning the seat of the piston-like closing element. In this manner the external control action required for cleaning the seat surfaces of the double seat valve is reduced to supplying a cleansing agent with the appropriate pressure when cleaning is required.

In another preferred embodiment of the invention, the external control action necessary for opening and closing the double seat valve is reduced in that the switching sequence in accordance therewith proceeds in a manner determined by the design of the valve after being initiated from outside the double seat valve. Since the blocking device and the space between the drive pistons therein are controlled always in the same manner, at most out of phase, a maximum of three control signals are required in a switching operation of the double seat valves (opening movement into open position, closing movement into closed position) according to the switching sequence of the invention. Thus, only one external control signal (open valve, close valve) is needed; the two others are generated internally.

In accordance with a further embodiment of the invention, cleaning of the seat surfaces can be intensified, particularly in the seat area of the closing element that may be in contact with the product, by repeating the partial lift movements several times.

In order to secure the seat disk against being forced out of its closing position by accidently applied counter pressure or impacts, additional force is provided selectively by a further aspect of the invention to press the aforesaid seat disk against its seat surface.

A further advantageous aspect of the invention provides a closing element such that the pressure forces exerted on the closing element by fluid in the valve casings are largely compensated. Such a measure renders the provision of additional force for the arresting movement of the closing element superfluous.

European Pat. No. 00 44 517 is addressed to the objective of the particular invention stressed therein, i.e., to permit the simultaneous cleansing of both seat surfaces of a double seat valve while product is present on at least one side of the valve, for the five basic types of valves illustrated in FIGS. 1 to 5a. However, a detailed description is provided only for the type of double seat valve that is shown in FIG. 4. The present invention not only addresses the particular objects listed above but incidentally concretely illustrates examples of apparatus suitable for providing simultaneous cleaning of the seat surfaces of both closing elements for other types of valves in accordance with that invention, in addition to the objects of the present invention listed above.

By the proposed apparatus for performing the method according to the invention it is possible for the first time to realize all of the functions relevant in the operation of double seat valves of the type characterized in the introduction in a concrete solution "as a harmonious whole", namely the leakage-free switching, the simultaneous cleaning of the seat surfaces of both closing elements, the separate cleaning of the seat surface of the structurally slide-like closing element possibly acted upon by the product by means of the supply of cleansing agent from the leakage cavity and the additional pressing of the closing element structurally formed as seat disk to its seat surface by means of an additional force or alternatively to the last-named function the compensation of the pressure forces exerted by the fluid in the pipes on the closing elements.

In advantageous modification of the apparatus according to the invention, the drive piston of the closing element which during the opening movement of the double seat valve is shifted into open position by the other closing element, is sealingly slidable on its valve stem during the opening movement of the double seat valve, while in the opposite direction of shifting it will engage form-closed on said valve stem via a collar. By this unilaterally effective separation between drive piston and associated valve stem there is achieved a simplification of the control. While, without said separation in the open position of the double seat valve, there must be controlled simultaneously two spaces (space between the pistons and a further space), the control in case of the separation of the drive piston from its valve stem, is reduced to the pressure load on the space between the pistons.

A further advantageous aspect of the apparatus according to the invention overcomes the partial lift limitation of drive pistons in apparatus where the partial lift is limited by a stop member located in the space between the drive pistons. The stop in the apparatus according to the present invention is disposed on a casing of the actuating device. This is feasible for configurations of the closing elements in which the piston-like closing element shifts the other closing element into an open position.

According to another advantageous aspect of the apparatus, the space between the drive pistons communicates via a passage therein or through the annular gap around the valve stem with the surroundings of the double seat valve. In this way the pressure agent is supplied, in a simple manner that is independent of valve movements, to the space between the drive pistons which changes in both its size and its position during the switching movement of the double seat valve.

BRIEF DESCRIPTION OF THE DRAWINGS

Preferred embodiments of the invention are shown in the drawing and are described in further detail below, wherein:

FIG. 1.1 is a longitudinal cross section through an embodiment of the apparatus for performing the inventive method in its closed position;

FIG. 1.1a is a table of functions with all switching sequences feasible in an apparatus according to FIG. 1.1, wherein the closed position of the double seat valve according to FIG. 1.1 is particularly emphasized;

FIG. 1.2 shows a longitudinal cross section through the above embodiment of the apparatus in its so-called "recall position";

FIG. 1.3 shows a longitudinal cross section through the above embodiment of the apparatus in its open position;

FIG. 1.4.1 shows a longitudinal cross section through the above embodiment of the apparatus in its seat cleaning position with the cleansing agent being supplied through the leakage cavity;

FIG. 1.4.2 shows a longitudinal cross section through the above embodiment of the apparatus in its seat cleaning position with the cleansing agent being supplied through a valve casing part;

FIG. 3.1 is a longitudinal cross section through an embodiment of the apparatus according to FIG. 3 being slightly modified in the area of the actuating device, wherein the closing elements are shown in their closed position;

FIG. 3.1a is a table of functions describing all switching states of the apparatus according to FIG. 3.1, with the shown closed position particularly emphasized;

FIG. 3.2 shows a longitudinal cross section through an embodiment of the apparatus according to FIG. 3.1, wherein the structurally slide-like closing element comprises a compensation piston sealingly conducted in the valve casing;

FIG. 3.2a is a table of functions describing all switching states of the apparatus according to FIG. 3.2, with the shown closed position particularly made conspicous;

DETAILED DESCRIPTION OF THE PREFERRED EMBODIMENT

Figure 11:
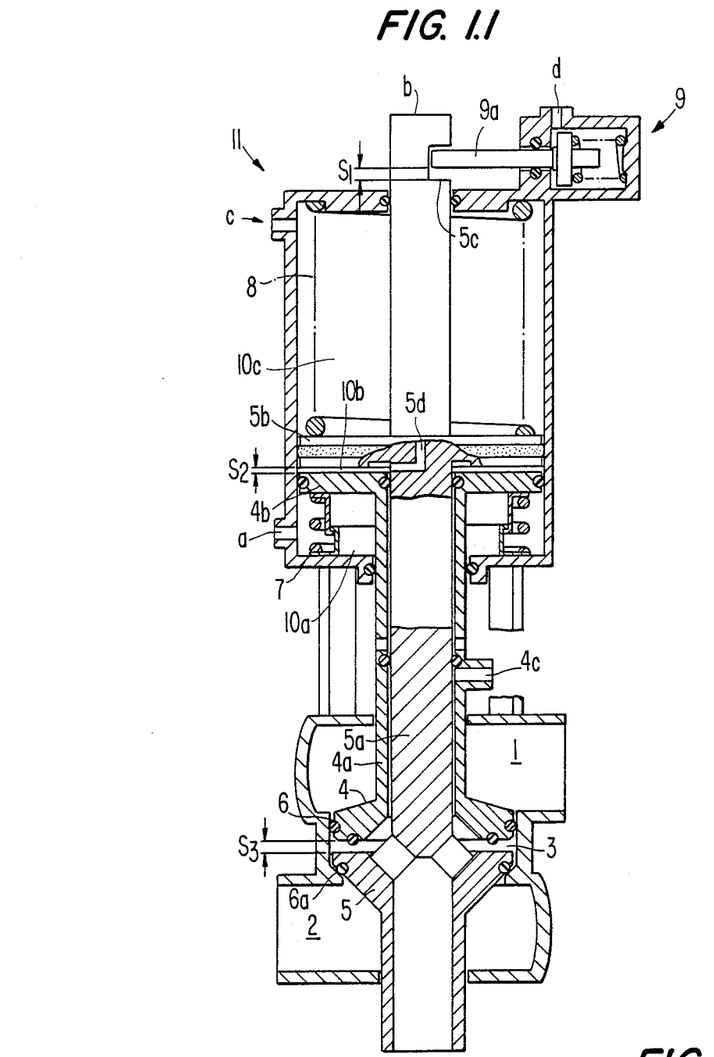

FIG. 1.1 shows an advantageous embodiment of the apparatus for performing the inventive method, in which a lower closing element 5 is designed as seat disk while an upper closing element 4 reveals a slide-like or piston-like shape. The closing element 5 has a gasket, not designated in detail, which acts substantially in axial direction on an associated seat surface 6a, while the closing element 4 is slidingly and axially sealingly shiftable within a cylinder bore 6 connecting two valve casing parts 1, 2 to each other via a gasket, not designated in detail, which is disposed at the outer circumference. Valve stems 4a or 5a, respectively, of closing elements 4, 5 point in one direction, engage with each other in a telescopic manner and are extended into an actuating device 11. Therein they are equipped with drive pistons 4b and 5b, respectively, which are each spring tensioned at least on one side and form within and with the actuating device 11 three chambers 10a, 10b, 10c separated from one another and selectively controllable independently from one another. Chamber 10a serves solely and firstly for the control of the externally disposed valve stem 4a, chamber 10c serves solely and firstly for the control of the internally disposed valve stem 5a, while by chamber 10b between the drive pistons 4b, 5b there is optionally controlled either the one or the other drive piston via a passage within valve stem 5a. The shown embodiment comprises—which is basically not always so—within chamber 10c a main spring 8, which braces itself on the one side against a bottom of a top wall, not designated in detail, of the actuating device 11, and on the other side against the drive piston 5b connected to the internally disposed valve stem 5a. Within chamber 10a is disposed an auxiliary spring or resilient stop 7, respectively, which braces itself on the one side against a bottom of actuating device 11 and on the other side against drive piston 4b connected to the externally disposed valve stem 4a. Both chamber 10a and chamber 10c have a fluid connection, each connection leading to the fluid connection, each connection leading to the chamber holding the main spring 8 being designated by c, while the other chamber is designated by a. The passage 5d to chamber 10b is given connection symbol b. A bolt 9A of a controllable blocking device 9, its pressure agent connection being designated by d, is received in a groove 5c disposed above actuating device 11 at the internally disposed valve stem 5a bolt 9a of a controllable blocking device 9, its pressure agent connection being designated by d. An annular gap, not designated in detail, which is formed between valve stems 4a, 5a, which engage with each other in a telescopic manner, exits at one end into a leakage cavity 3 formed between closing elements 4,5 both in the closed and the open position of the double seat valve and on one side is fitted with a cleansing agent connection 4c. Closing element 5 can perform an axial partial lift movement s1 out of its closing position limited by bolt 9a. A partial lift movement of the lower closing element 5 out of the closed position performable relative to the upper closing element 4 out of the closed position is designated s3. The distance between drive pistons 4b, 5b in the closed position of the double seat valve is designated s2.

The table of functions (FIG. 1.1a) illustrates which of the pressure fluid connections a to d in closed position "1" of the embodiment of the apparatus shown in FIG. 1.1 are connected (compare line "1"). Therein a=0 signifies that connection a is not triggered and hence the associated chamber 10a is not supplied with pressure agent; c=1 signifies that connection c is triggered and therefore the associated chamber 10c is supplied with pressure agent connection b is not triggered and therefore the associated chamber 10b is pressureless; d=(0) signifies that connection d is not triggered and therefore the spring-closing blocking device 9 is in its resting position in which bolt 9a arrests form closed the internally disposed valve stem 5a. A control condition of the blocking device 9 placed between parentheses in FIG. 1.1a is to indicate that, for the realization of the present switching state of the double seat valve, there is not obligatorily required the presence of the blocking device 9. The switching states further evident from the table of functions according to FIG. 1.1a of connections a, c, b, and d and the associated chambers of the inventive apparatus are illustrated in the lines "2, 3, 4.1 and 4.2". Here the switching state "2" designates the so-called "recall position", switching state "3" the open position, the switching state "4.1" the seat cleaning R1 and the switching state "4.2" the seat cleaning R2, of the double seat valve. These switching states indicated above are further explained in the subsequent FIGS. 1.2 to 1.4.2.

Drive piston 5b is charged with a force via the main spring 8. In addition to this force there acts in the same direction an additional force which presses the closing element 5 shaped as seat disk to seating surface 6a. The upper closing element 4 braces itself via the externally disposed valve stem 4a and the associated drive piston 4b on the auxiliary spring 7, wherein the latter is clamped by means not shown in detail and thus must hold only the own weight of assembly 4, 4a, 4b and optionally the force resulting from product weight in valve casing part 1 and acting on the upper closing element 4. In the illustration according to FIG. 1.1 it is assumed that no effects of force of piston 4b act on the auxiliary spring 7. In case the product is present under pressure in value casing part 2, then it can in combination with the effective surface of closing element 5 press the latter off its seating surface 6a only when the opening force is greater than the algebraic sum of the pre-stressing force of the main spring 8 and the additional force Pc×A, wherein the symbol Pc represents the pressure of the pressure agent supplied through connection c and symbol A designates the effective piston surface of drive piston 5b. Should the lower closing element 5 nevertheless be lifted off its seat surface 6a for instance by pressure impacts, its lift movement s1 is limited by bolt 9a of the blocking device 9. Since the relative partial lift movement s3 is performed expediently greater than the partial lift movement s1 against bolt 9a, the medium present under pressure in valve casing part 2 can be removed pressureless through leakage cavity 3 and the hollow valve stem of closing element 5 which extends from the bottom of valve casing part 2. A pressure concentration in leakage cavity 3 is therefore excluded. Even if hypothetically assuming a pressure concentration, the upper, slide-like closing element 4 cannot be displaced in the proposed embodiment of the apparatus according to the invention to such an extent in direction of the product-leading valve casing part 1 that it will leave its closed position within the cylinder borehole 6, since, after displacement by the distance s2+s1, it will at first abut with its drive piston 4b against drive piston 5b, which via the internally disposed valve stem 5a, is arrested at bolt 9a of the blocking device 9.

Figure 12:
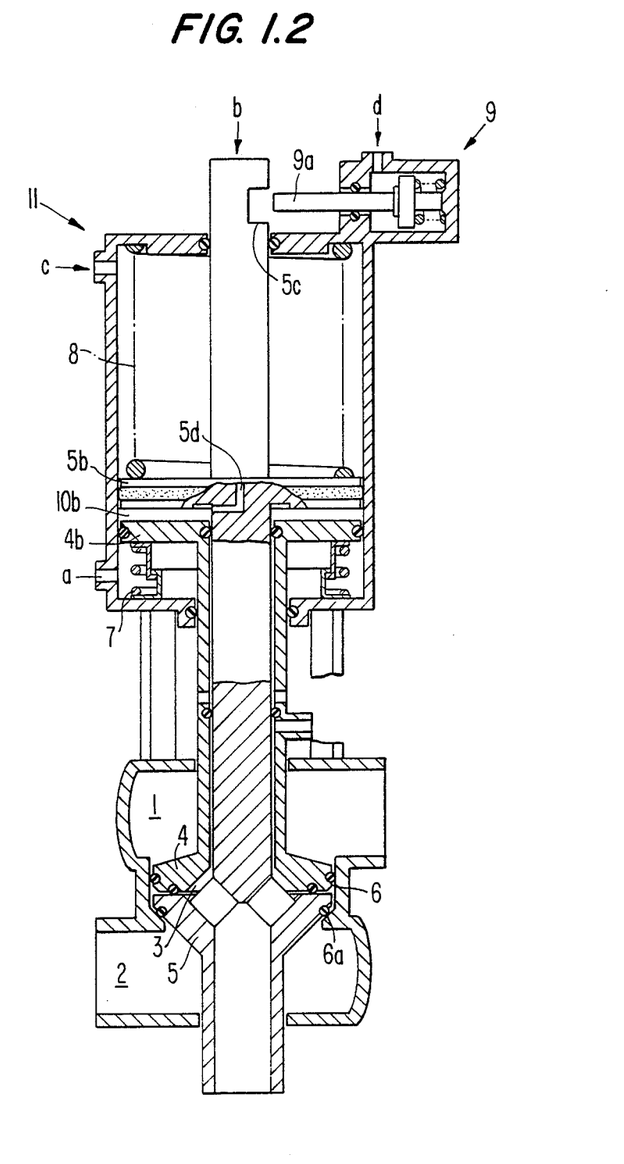

Further switching states of the embodiment of the inventive apparatus according to FIG. 1.1 are shown in the subsequent FIGS. 1.2 to 1.4.2. FIG. 1.2 shows the inventive apparatus in its so-called "recall position" "2". This "recall position" is characterized in that prior to the opening movement of the closing element 5, the closing element 4 is advanced from its resting position to the closing element 5 in its closed position and is coupled to the latter in such a manner that the leakage cavity 3 is tightly sealed against the cylinder borehole 6 enveloping it. For generating this switching state of the inventive apparatus there must be triggered connection b, assuming a preceding closed position of the double seat valve. The additional force, caused by the triggering of connection c is now as before effective. The blocking device 9, which need not obligatorily be present, as already mentioned above, is triggered via its connection d; its bolt 9a left groove 5c within the internally disposed valve stem 5a. The triggering states of the individual connections a through d are shown in the table of functions, FIG. 1.1, line "2":

a=0;

c=1;

b=1;

d=(1).

By the pressure agent applied via pressure agent connection b and passage 5within chamber 10b the drive pistons 4b, 5b are pressed apart. The force of the main spring 8 and the additional force $Pc \times A$ act on the one side of drive piston 5, and on the other side, a force $Pb \times A$ resulting from pressure agent present in chamber 10b acts. The latter force acts equally on the drive piston 4b of the upper closing element 4 and thus shifts it against the prestressed and clamped auxiliary spring 7 downwardly so far that the closing element 4 abuts the closing element 5. At the contact point of the two closing elements 4, 5 the force $Pb \times A$ passed through the externally disposed valve stem 4a braces itself once more so that, taken as a whole, the lower closing element 5, its valve stem 5a and the associated drive piston 5b are not subjected to any externally effective action of force. The latter structural elements are merely tensioned internally under force $Pb \times A$. The lower closing element 5 is pressed on its seating surface 6a with the force resulting from the force of the main spring 8 and the additional force $Pc \times A$. Neither from the one nor from the other valve casing part 1,2 can for instance product reach the leakage cavity 3. In the closed position of the double seat valve, the tension of the main and auxiliary springs are so proportioned that in case of absence of the pressure agent and thus the omission of the additional force, there is ensured an unambiguous closing position.

In FIG. 1.3 there is then shown the open position "3" of the apparatus according to the invention as shown in FIGS. 1.1 and 1.2. The table of functions according to FIG. 1.1a describes in line "3" the associated triggering states of connections a through d:

a=1;

c=0;

b=1;

d=(1).

Figure 13:
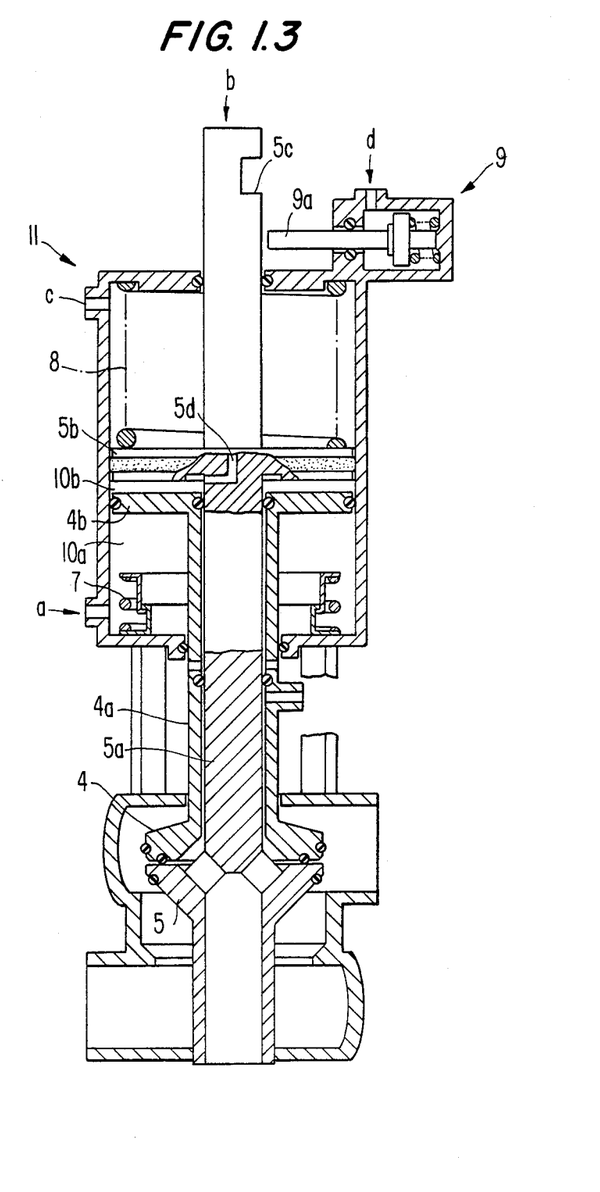
Figure 14:
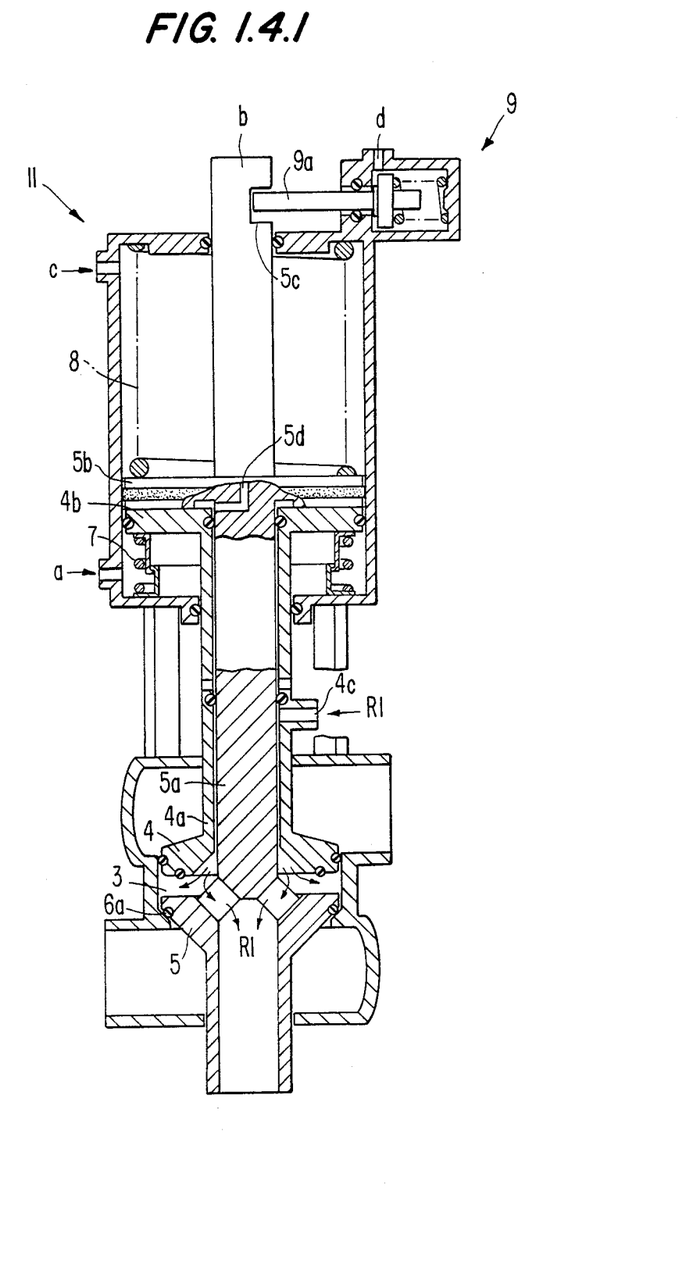

Under force $Pb \times A$ the coupling of closing elements 4, 5 is maintained during the entire opened position "3" of closing element 5. Under the influence of the pressure agent present in chamber 10a and the force $Pa \times A^*$ resulting therefrom, the drive piston 4b moved upwardly up to its possible end position. The clamped auxiliary spring 7 is abandoned; it exercises no action of force whatsoever on drive piston 4b. By means of the action of force effective in chamber 10b and the bracing resulting therefrom on adjacent drive pistons 4b, 5b, the closing elements 4, 5, the valve stems 4a, 5a, and associated drive pistons 4b, 5b behave like an integral structural element which by the force $Pa \times A^*$ is displaceable as a whole against the force of the main spring 8. Since the active plane $A^*$ facing chamber 10a is in principle always smaller than the plane A facing chamber 10b and at the same time the pressures of the pressure agent Pa and Pb as a rule are alike, the coupling of the closing elements 4,5 is in any event retained under the opening force $Pa \times A^*$ due to $Pb \times A > Pa \times A^*$. For pressures $Pb > Pa$ the coupling force may be further increased.

The closing movement of the inventive apparatus proceeds analogously in the reversed sequence. A look at the triggering states of the recall position "2", shown in the table of functions according to FIG. 1.1a, line "2", shows that at first closing elements 4,5 in coupled position are lowered into the closing position of closing element 5. Before, during or after the lowering there can be applied already the additional force via connection c on the closing element 5. Only after reaching the closing position of closing element 5, the closing element 4 will be separated from closing element 5 and moved to its resting position. The separation is effected by removing the triggering at connection b under the effects of force F7 of the auxiliary spring respectively the resilient stop 7. The coupling force of closing elements 4, 5 finally effective in the recall position "2" or the open position "3" of the inventive apparatus is obtained, as may easily be proven, from:

Coupling force in recall position $Fk = Pb \times A - F7$;

Coupling force in open position
$Fk = Pb \times A - Pa \times A^*$.

In FIG. 1.4.1 is shown the seat cleaning R1 "4.1" of the apparatus according to the invention, wherein the cleansing agent R1 is supplied through the leakage cavity 3 to the seat surface of the closing element 4. The triggering states for this step are apparent from line "4.1" of the table of functions according to FIG. 1.1a. The closing element 5 is pressed on its seat surface 6a under the action of force of main spring 8 and the additional force $Pc \times A$. Under the action of force $Pa \times A^*$ the drive piston 4b was moved upwardly by the partial lift s2 shown in FIG. 1.1 up to the stop at the drive piston 5b. The auxiliary spring 7 in this position of the drive piston 4b does not exercise any longer any action of force on the latter. By the partial lift movement s2 of closing element 4, its seat surface became exposed so that cleansing agent R1 can be supplied through the cleaning agent connection 4c, the annular gap between the valve stems 4a, 5a, and the leakage cavity 3, from outside the double seat valve.

The seat surface cleaning R2 "4.2" of the inventive apparatus with the simultaneous cleaning of both seat surfaces by using the cleansing agent R2 from the valve casing part 2 is shown in FIG. 1.4.2. The associated triggering state of connections a through d is shown in line "4.2" of the table of functions according to FIG. 1.1a:

a=1;

c=b=d=0.

Under the action of force Pa×A* the drive piston 4b of the upper closing element 4 moved towards the stop member at drive piston 5d of the lower closing element 5. In that way the partial lift s3 as shown in FIG. 1.1 was enlarged by the distance s2 also shown in FIG. 1.1. With this distance there are now jointly moved both closing elements 4, 5 by the partial lift s1 shown in FIG. 1.1 against bolt 9a of the blocking device 9. Both seat surfaces are in this way exposed and can be cleaned by means of the cleansing agent R2 supplied out of valve casing part 2. Cleansing agent 2 is then conducted to the leakage cavity 3 to flow off through the hollow valve stem exiting from the latter. Since the opening force Pa×A* is so dimensioned that it is able to overcome the force F8 of the main spring 8 in the fully open position of the double seat valve, there is given in the illustrated seat cleaning position an excess of force Pa×A*−F8, which is absorbed by bolt 9a of the blocking device 9.

Figures 2, 2A:
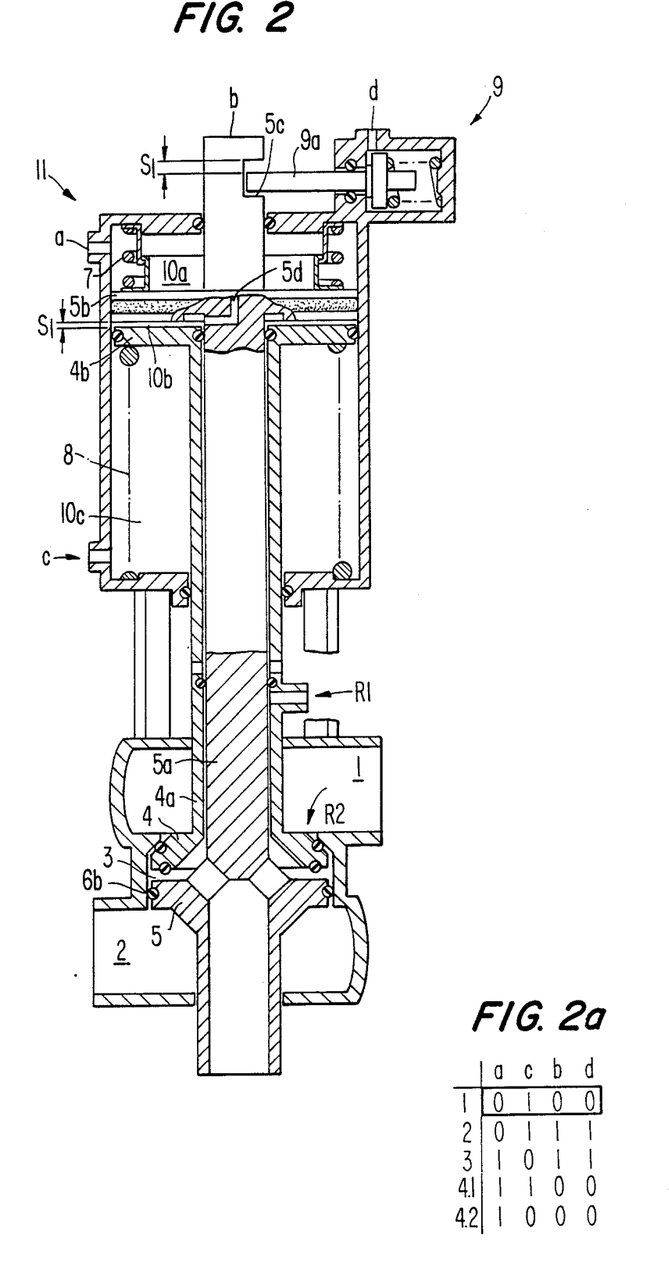
FIG. 2 shows a longitudinal cross section through another embodiment of the apparatus according to the invention for performing the inventive method, wherein the two closing elements are configured reversedly to the apparatus shown in FIG. 1.1 and are shown in their closed position.
FIG. 2a is a table of functions describing all switching states of the apparatus according to FIG. 1, the closed position being particularly emphasized.

A further embodiment of the apparatus for performing the inventive method having a fundamentally differently configured switching element arrangement from the embodiment of FIG. 1.1 is shown in FIG. 2. Upon comparing the switching element configuration with that of the embodiment of FIG. 1.1, it is found that the difference is the result of a mirror inversion at the separating plane between closing elements 4,5. This finding can also be transferred without restriction to the configuration of actuating device 11. While the configuration of valve stems 4a, 5a with their associated drive pistons 4b, 5b can be adopted without alteration, the external chambers around chamber 10b, which are limited by drive pistons 4b, 5b, are horizontally reflected. This obligatorily results in an exchange of the designations of connections a and c. A comparison of the triggering states of connections a through d in the feasible switching states "1" to "4" described in the table of functions according to FIG. 2a with those according to FIG. 1.1a reveals that the switching logic of the embodiment according to FIG. 2 is completely identical to that according to FIG. 1.

Figure 5:
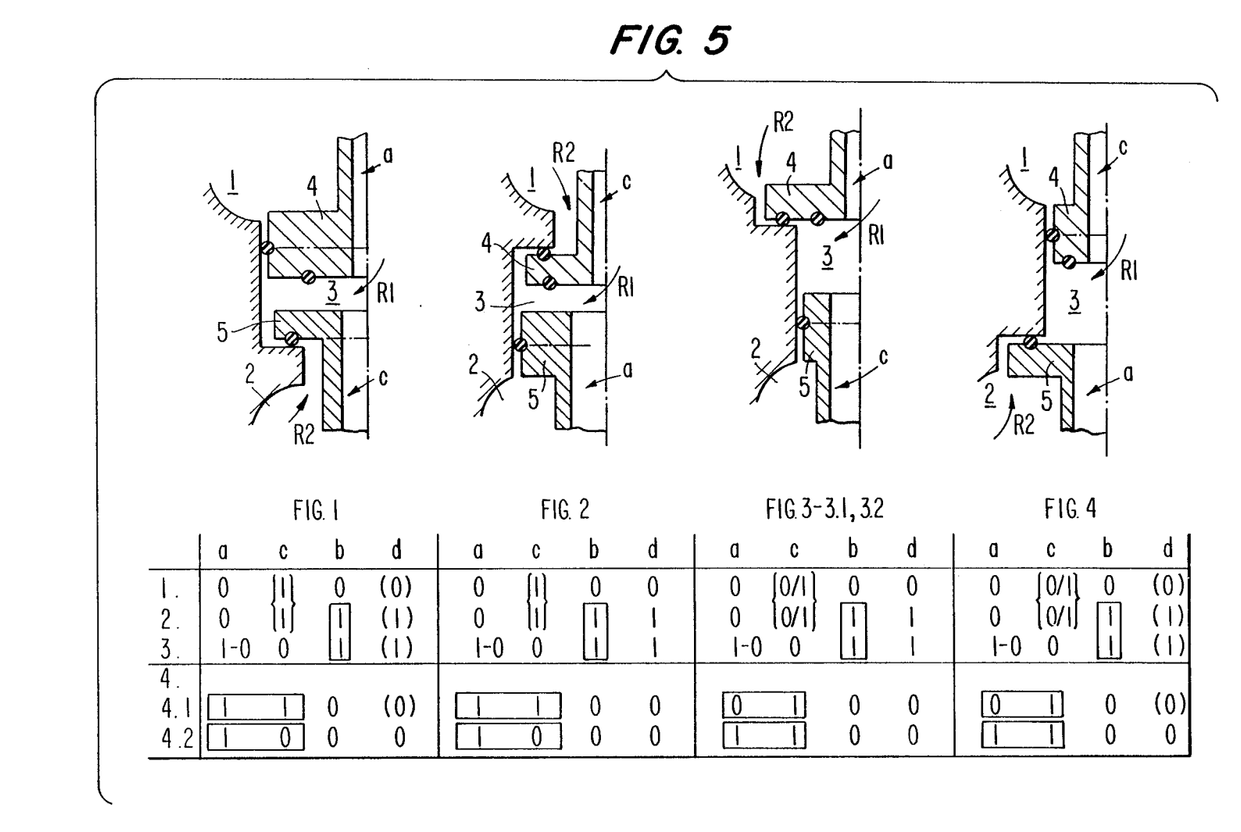
FIG. 5 gives a survey of the four on principle feasible configurations of two closing elements in a schematic representation and the respective association of the switching logic required for the performance of the inventive method in form of complete functional tables.

This context is also evident in an impressive way from the consolidating illustration in FIG. 5. The same is applicable for the force relations on drive pistons 4b, 5b when assuming that a mirror inversion should be made in the manner explained above.

In the closed position "1" of the shown embodiment, the force F8 of the main spring 8 must be dimensioned so that in the recall position "2" there is applicable:

F8+Pc×A*>Pb×A, since the piston surface A acting in chamber 10b on drive piston 4b is greater than the piston surface A* acting on the same piston in chamber 10c.

For the open position "3", the seat cleaning R1 "4.1", and the seat cleaning R2 "4.2" the statements made regarding the embodiments according to FIG. 1.1 are analogously applicable. The distance s1 within the groove 5c determining the partial lift of the internally disposed valve stem is located above bolt 9a of the blocking device 9, since the opening movement of the shown double seat valve is effected downwardly.

Figures 3, 3A:
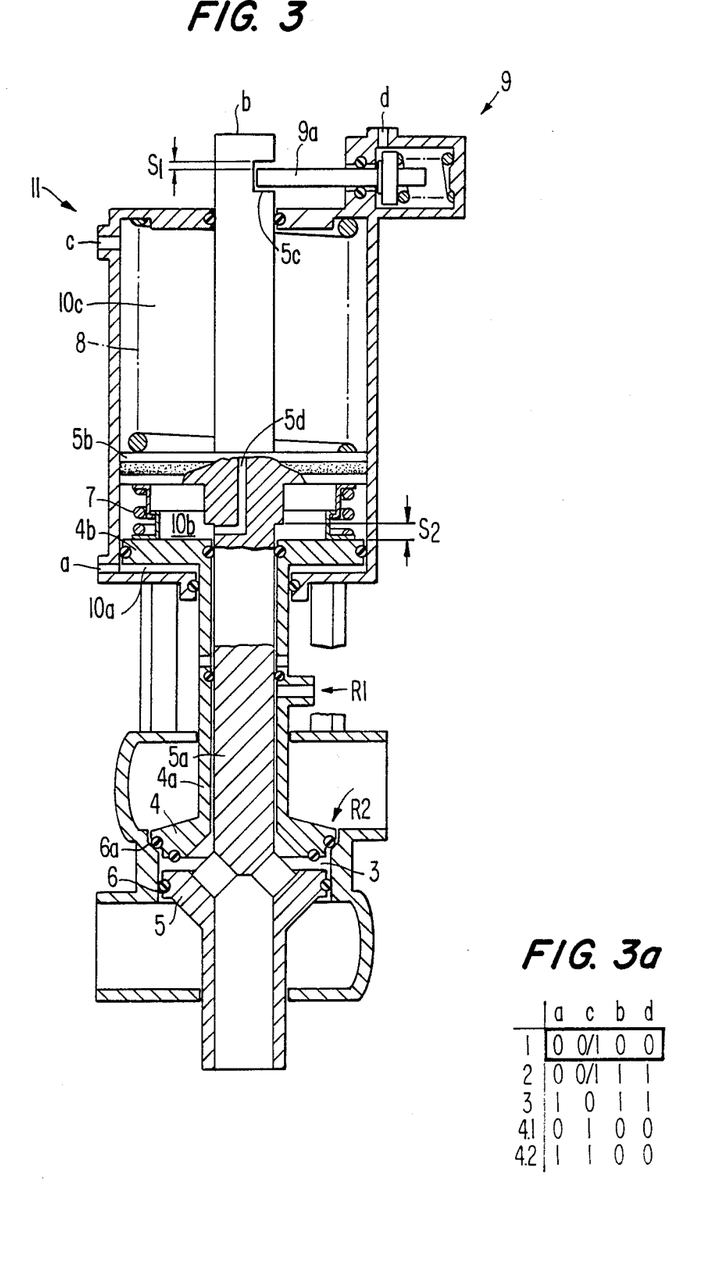
FIG. 3 is a longitudinal cross section through a further embodiment of the inventive apparatus for performing the method according to the invention, wherein the two closing elements are configured in a third arrangement on principle feasible and are shown in their closed position.
FIG. 3a is a table of functions describing all switching states of the apparatus according to FIG. 3, with the closed position particularly made conspicuous.

A fundamentally feasible third configuration of switching members is illustrated in three further embodiments slightly modified in respect of one another of the apparatus for performing the inventive process in FIGS. 3, 3.1 and 3.2. The upper closing element 4 is structurally shaped as seat disk, the lower closing element 5 is structurally slide-like. The opening movement of the double seat valve is effected upwardly, since the seat surface 6a is disposed below the upper closing element 4. The embodiments according to fig. 3, 3.1 and 3.2 differ in respect of their actuating device 11 from that according to FIG. 1.1 only in that the auxiliary spring, respectively the resilient stop 7 is now provided in chamber 10b between the drive pistons 4b, 5b. The triggering states of connections a through d in all switching states "1" to "4.2" are shown in the table of functions according to FIG. 3a, FIG. 3.1a, or FIG. 3.2a, respectively. From the switching states "2" and "3" under triggering b is evident a general switching principle as had become apparent already in the embodiments described in the foregoing. These common features are individually pointed out in the consolidating illustration of FIG. 5.

In the shown closed position "1" of the embodiment of the inventive apparatus according to FIG. 3, the application of an additional force Pc×A is possible. It acts indirectly via drive piston 5b and auxiliary spring 7 on the drive piston 4b of the upper closing element 4 shaped as seat disk. This is shown in the table of functions in FIG. 3a in line "1" under connection c (Numeral 1 after the slash). Furthermore, it is readily possible to recognize that under the dimensional proportions shown in the drawing, the additional force in the recall position "2" (compare line "2" in FIG. 3a) can be kept maintained only when the annular cross section effective on drive piston 4b in chamber 10b is greater than the annular cross section A effective on drive piston 5b in chamber 10c, as otherwise there cannot be generated a resultant lifting power directed upwardly on drive piston 5b.

Individual switching states and the further manner of effect of the embodiment according to FIG. 3 are not discussed in detail since the above statements in connection with the switching logic according to FIG. 3a render the pertinent context and the manner of operation obvious for an expert.

FIG. 3.1 shows a modification of the embodiment according to FIG. 3. The blocking device 9 is here developed more realistically than in FIG. 1 to 3. Spheres 9a serve as bolts, which engage with a groove 5c in valve stem 5a and can be controlled via a piston 9b. The actuating was simplified in so far as the pressure agent, exiting from a connection b, d, now branches off at the same time into blocking device 9 and into chamber 10b between the drive pistons 4b, 5b. The conspicuous difference to the embodiment according to FIG. 3, however, resides in that the drive piston 4b is sealingly slidable on its valve stem 4a in the direction of closing element 4, while in the opposite direction it abuts the valve stem 4a form-closed via a collar 4d. The main spring 8 is located in a cage 5e, 5f, so that there is precluded any further downward movement of the slide-like closing element 5 against the force of auxiliary spring 7. In chamber 10b between the drive pistons 4b, 5b there is a stop 12 disposed on the casing of actuating means 11, which stop limits the partial lift movement s2, s1 of drive pistons 4b or 5b, respectively. Chamber 10b may also be communicating with the surroundings through a bore 14 passing through both the casing of the actuating device 11 and the stop 12. In contract to the control of the apparatus according to FIG. 3 there is, in the modified embodiment according to FIG. 3.1 for the realization of the opening position, triggered only chamber 10b (compare line "3" of the table of functions according to FIG. 3.1a). Upon this triggering the drive piston 5b moves upwardly. Owing to this movement there are also moved upwardly the closing element 4 and the associated valve stem 4a. The drive piston 4a can in accordance with the invention not follow this movement, since under the action of force of the pressure agent acting in chamber 10b it is slidable relative to its valve stem 4a and comes to abut at the lower bottom of actuating device 11. All of the remaining triggering states in the other switching states are unaltered in view of those of the table of functions according to FIG. 3a.

Figures 3, 31:
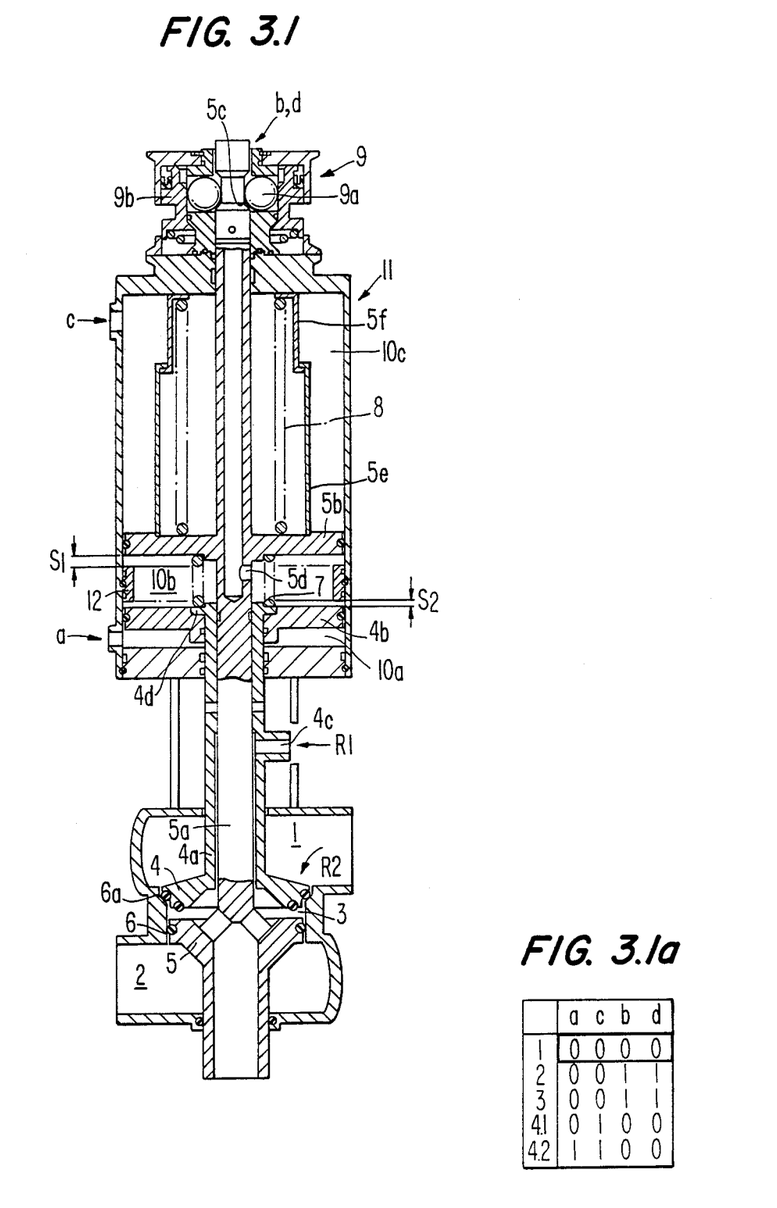
Figure 3:
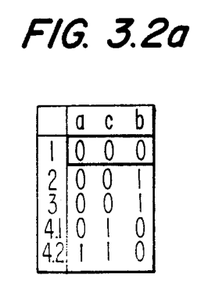
Figure 32:
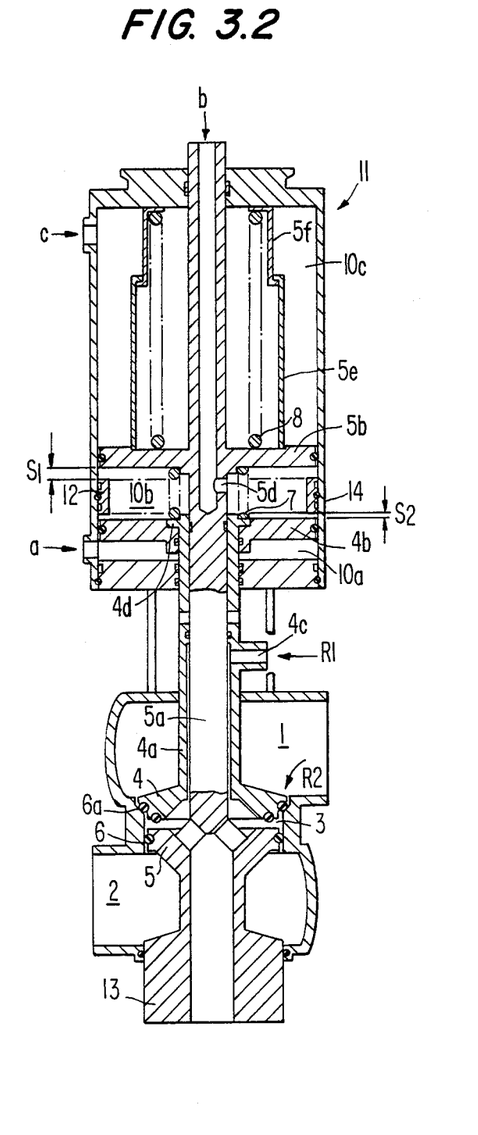

The unilaterally effective separation of the drive piston, which causally initiates the valve opening and valve closing movements, from its valve stem can be applied to all configurations of the closing element described in the foregoing or hereinafter. The advantages achievable in this respect with the embodiments according to FIG. 3.1 and 3.2 are provided also in the other embodiments.

In the embodiment according to FIG. 3.2 the structurally slide-like designed closing element 4 comprises a compensating piston 13 sealingly conducted in the valve casing part 2, said compensating piston 13 having the same diameter as the cylinder borehole 6. Herewith the action of force exerted by the fluid in the valve casing part 2 on the closing element 5 is largely compensated. The blocking device 9 can be omitted, since neither in the closed position "1" nor in the seat cleaning position "4.1 or 4.2", respectively, there is necessary an arresting of valve stem 5a (compare also table of functions according to FIG. 3.2a).

Figures 4, 4A:
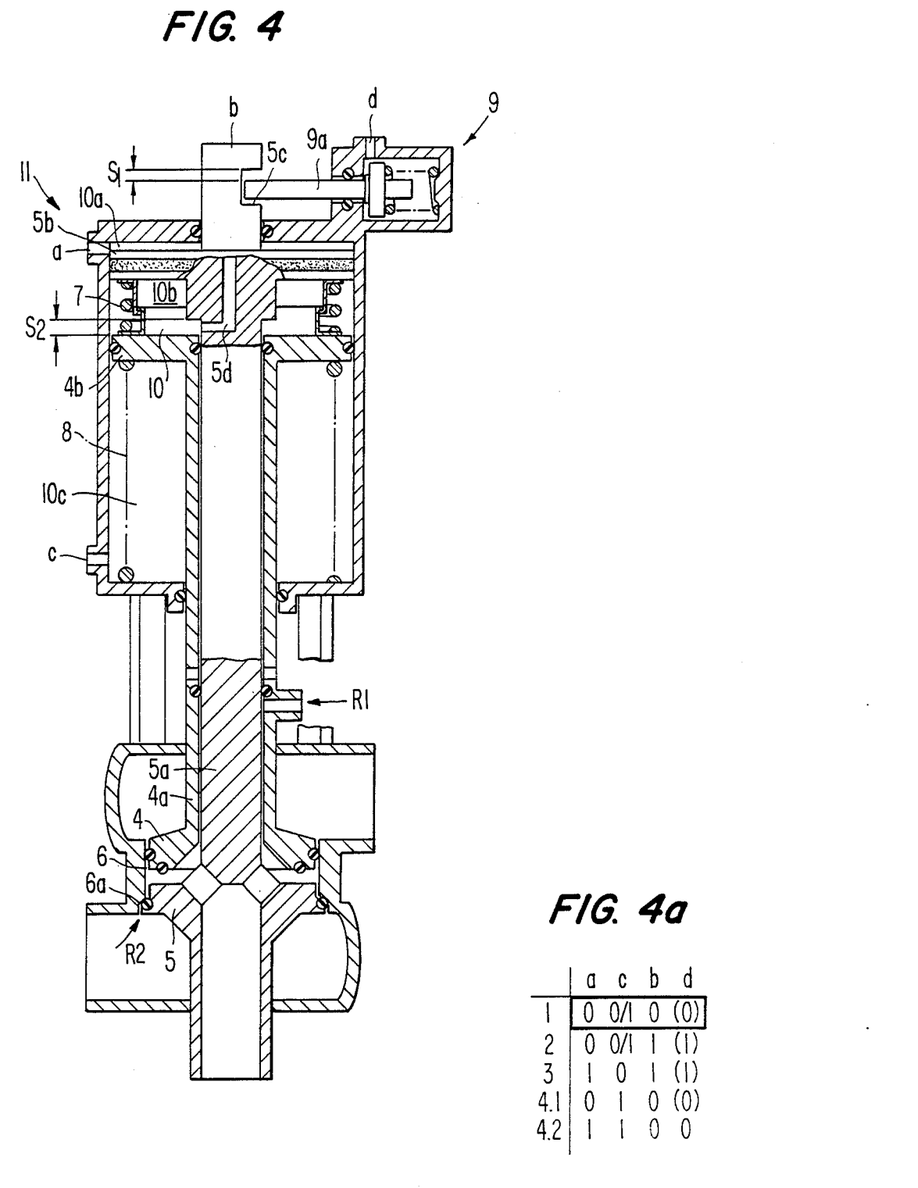
FIG. 4 is a longitudinal cross section through a further embodiment of the apparatus of the invention for performing the inventive method, wherein the two closing elements are configured in a fourth arrangement in principle feasible and are shown in their closed position.
FIG. 4a is a table of functions describing all switching states of the apparatus according to FIG. 4, wherein the shown closed position is particularly made conspicuous.

FIG. 4 shows another embodiment of the apparatus according to the invention. It shows a double seat valve in which the closing elements 4,5 are configurated according to a fourth fundamentally feasible alternative. The lower closing element 5 is shaped as seat disk and is pressed from below on seat surface 6a. The upper closing element 4 has the shape of a slide. The present arrangement of closing elements is mirror inversed in view of the embodiments according to FIGS. 3, 3.1 and 3.2 around a horizontal axis of symmetry extending between closing elements 4, 5. In respect of the actuating device 11 there are analogously applicable the statements made above regarding the actuating devices in the embodiments of figures 1.1 and 2, the mirror axis again extending horizontally through chamber 10b.

A detailed description of instant embodiment is omitted as the statements made in respect of the embodiment of FIG. 3 are analogously applicable as well. A comparison of all switching states "1" to "4.2" shown in the table of functions according to FIG. 4a with those of FIG. 3a proves that both are completely identical in all positions. The application of an additional force Pc×A* can be effected both in the closed position "1" and in the recall position "2" of the double seat valve when the auxiliary spring or resilient stop 7, respectively, is appropriately designed since the additional force is transmitted by drive piston 4b via the auxiliary spring 7 to drive piston 5b associated to closing element 5 shaped as seat disk. The recall position "2" under the additional force Pc×A* is feasible when the action of force Pb×A, which spreads the two drive pistons 4b, 5b is greater than the action of spring F8 plus additional force Pc×A* (compare numeral 1 following the slash in the lines "1" and "2" of FIG. 4a).

Figure 1:
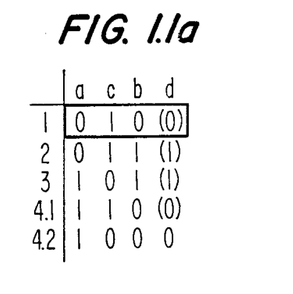

In FIG. 5 is given a combined survey of the four disclosed fundamentally feasible configurations of the closing elements in connection with the pertinent tables of functions. One principle of function and effect is common to all four fundamental configurations of the closing elements. This is the coupling of closing elements 4,5 in the recall position "2" and in the open position "3" by the spreading of the drive pistons 4b, 5b, thus solving the partial objective stressed according to the invention to provide a leakage-free switching of the double seat valve. It is evident in all four instances that both in the recall position "2" and in the open position "3" the chamber between the drive pistons 4b, 5b, is controlled (b=1). Moreover, a further objective according to the invention is achieved, namely to ensure the simultaneous cleaning of the seat surfaces of both closing elements (compare line "4.2", connections a and c). A solution for this partial problem had become known from European Pat. No. 00 44 517 only for the configuration of closing elements according to FIG. 1 in a concrete manner. The fact that concrete solutions are now available also for the third partial objective of the invention, namely to ensure the cleaning of the seat surface of alone the slide-like shaped closing element acted upon by the product, is shown by line "4.1" in FIG. 5. Furthermore, in all four instances the closing element 5 or 4, respectively, which is shaped as seat disk, can selectively be pressed by an additional force on its seat surface (compare lines "1" and "2", connection c=1).

The unilaterally effective separation of drive piston 4b from its valve stem 4a according to the invention is illustrated in detail by the example of the configuration of closing elements according to FIG. 3. Said separation is, as was explained above, transferable to all configurations of closing elements. From FIG. 5 (compare line "3", column a) it is apparent that all pertinent embodiments differ from those without separation merely in the triggering of chamber 10a. While without separation of the drive piston 4b or 5b, respectively, from its valve stem 4a or 5a, respectively, the connection a has the control state a=1, it is given in case of a separation the control state a=0.

As regards the arrangement of the blocking device 9 in the cooperation with the internally disposed valve stem 5a the arrangements according to FIGS. 1.1 to 3 and 4 or according to FIG. 3.1 had been selected only as examples. It is just as feasible that the blocking device 9 connected to stationary casing parts of the double seat valve arrests the externally disposed valve stem 4a. Moreover, the blocking device 9 shown in FIGS. 1.1 to 3 and 4 more or less relates to a skeleton sketch describing the manner of effect more than the actual structural shape. There are available, besides the embodiment according to FIG. 3.1, a number of realizable structural types; one type thereof—although in combination with a means locking the valve stems together—is exemplified in European Pat. No. 00 44 517.

Which of the proposed embodiments of the apparatus for performing the inventive process is given preference in practice can be evaluated only on the basis of concrete applications. Since all four configurations of closing elements realize leakage-free switching as well as the possibility of cleaning either both seat surfaces simultaneously or solely that of the structurally slide-like designed closing element acted upon by the product, the choice will depend on specific conditions of the utilization. When for instance such a double seat valve is intended for use in a tank outlet, then mostly there is the requirement that upon complete discharge of the tank the connected valve casing is completely drained, too. This will require connecting the tank at the upper part of the valve casing while as a rule the configuration of closing elements to be selected would be the arrangement shown in FIG. 4. In case it must be safely prevented, for instance, that unsystematically occurring pressure rises or pressure impacts in the conduits press open the double seat valve, there must be chosen owing to this requirement another closing element configuration than in the case when it is only required that unsystematical pressure impacts must be absorbed by one of the two closing elements. In case the detachability of the closing elements 4, 5 together with their valve stems 4a or 5a, respectively, in an upward direction is an irrevocable demand, then as a rule the embodiments of FIG. 2 or 4 are excluded unless the entire seat area can also be dismounted from the valve casing, as is sometimes practiced.

What is claimed is:

1. A method for operating a leakage-free switching double seat valve having valve seats to clean surfaces of the valve seats, particularly during use of the valve in the food processing industry, wherein the valve includes two closing elements (4,5) moveable independently of each other and relatively to each other, the closing elements being moveable from a closed position into an open position by means of actuation devices, and one of the closing elements, which may be subject to product action, being structurally piston-like for sliding and radially sealing movement within a cylinder bore connecting two valve casing parts (1,2) and being displaceable for the cleaning of its seat by a partial lift away from the other closing element, while simultaneously the other closing element (5 or 4, respectively), which is designed as a seat disk, is displaceable with respect to the one closing element which may be acted upon by the product, by a synchronous or opposite partial lift, with a leakage cavity (3) enclosed between the closing elements (4,5) both in a closed and in an open position of the double seat valve, the leakage cavity being connected to the atmosphere, a cleansing agent being advanced to the two seat surfaces which are exposed by the partial lifts of the closing elements through the other valve casing part (2 or 1, respectively) and/or from outside the double seat valve via the leakage cavity (3), comprising
switching the double seat valve from a first condition in which the piston-like closing element (4 or 5, respectively) and the other closing element (5 or 4, respectively) engage their respective valve seats and are spaced from one another to a second condition in which the other closing element (5 or 4) remains engaged with its valve seat and in which the seat of the piston-like element (4 or 5) is exposed to the cleansing agent, wherein the step of switching comprises moving the piston-like element from its seat away from the other closing element (5 or 4) in a partial lift to a point at which the piston-like element is still in sealing engagement within the cylindrical bore so that the cleansing agent can clean the valve seat of the piston-like closing element without causing product contamination.

2. The method of claim 1, further comprising supplying the cleansing agent to the exposed valve seat from outside the double seat valve through the leakage cavity (3).

3. The method of claim 2, wherein the step of switching comprises repeatedly moving the piston like element between its seat and a point spaced from the seat at which the piston-like element is still in sealing engagement with the cylindrical bore.

4. A method according to claim 2, characterized in that the cleansing agent (R1) provided from outside the double seat valve upon exceeding a selectively adjustable pressure causally starts the switching sequence proceeding as a valve-internal switching algorythm, which is necessary for cleaning the surface of the structurally piston-like closing element (4 or 5, respectively).

5. A valve having two valve seats in a bore connecting first and second valve casings, said valve adapted to permit simultaneous cleaning of the surfaces of both valve seats without contaminating product, which is in one of the valve casings, said valve comprising:
first and second closing elements selectively contacting said seat surfaces to define valve-open and valve-closed positions, said closing elements being movable between said valve-open and valve-closed positions and movable relative to one another, said closing elements defining a leakage cavity between them;
said first closing element being in contact with the product during the cleaning of the seat surfaces and being structurally piston-like and slidable within the bore for radially sealing against a surface defining the bore to prevent the product from entering the leakage cavity; and
means for moving said first and second closing elements between said valve-closed positions and said valve-open positions, said moving means including means for partially lifting said first closing element to a position spaced from its valve seat but still in sealing engagement with the bore-defining surface, while simultaneously leaving said second closing element engaging its valve seat, during a time in which the leakage cavity is exposed to a cleansing agent so that the cleansing agent can clean the valve seat of the piston-like closing element without causing product contamination.

6. The valve according to claim 5, wherein the first and second closing elements each have a valve stem, the valve stems extending in the same direction and being telescopic with respect to one another, and means for arresting the movement of one of the valve stems, said arresting means comprising a blocking element movable into and out of blocking engagement with said one of the valve stems.

7. The valve according to claim 6, wherein the first and second closing elements each have a valve stem, the valve stems extending in the same direction and being telescopic with respect to one another, and said means for moving the closing elements comprises a fluid pressure cylinder and a drive piston connected to each valve stem, both drive pistons being positioned in said cylinder, said drive pistons defining within said cylinder three spaces separate from one another, and means for supplying each said space with pressure fluid.

8. The valve according to claim 7, wherein said supplying means comprises a passage within one of said valve stems for supplying pressure fluid to a space defined between said drive pistons.

9. The valve according to claim 5, wherein said first and second closing elements each have a surface facing the adjacent valve casing, and at least one of said first and second closing elements has a valve stem and a compensation surface connected to said valve stem, said compensation surface lying in one of said valve casings, facing toward the adjacent closing element, and having an area sufficient to offset the force of the fluid in the casing which acts on the adjacent closing element and urges the adjacent element toward its valve seat.

10. The valve according to claim 9, wherein said compensation surface is on a piston slidingly received in an opening through a wall of said one valve casing lying opposite the bore of the valve, said piston having the same diameter as the bore.

11. The valve according to claim 7, wherein one of said closing elements engages and moves the other closing element, and the drive piston connected to the valve stem of the closing element moved by the other closing element is slidable on its valve stem, when the closing elements are moved to the valve-open position, and is engaged by a collar projecting from the valve stem of the closing element moved by the other closing element when said valve stem is moved in the opposite direction.

12. The valve according to claim 11, wherein a stop member is disposed in said fluid pressure cylinder between said drive pistons, said stop member engaging said drive pistons to limit the movement of said drive pistons.

13. The valve according to claim 11, wherein said pressure fluid supplying means comprises a passage defined through one of said valve stems, said one valve stem passing through said stop member.

14. A method according to claim 1, wherein the closing element (5 or 4, respectively) structurally designed as seat disk is selectively pressed by an additional force against its seat surface (6a).

* * * * *